Patented Aug. 24, 1954

2,687,364

UNITED STATES PATENT OFFICE 2,687,364

PROCESS FOR CEMENTING PLASTICALLY DEFORMABLE BODIES AND PRODUCTS THEREOF

Martin J. Buerger, Lincoln, and Edward Washken, Belmont, Mass., assignors to Owens-Illinois Glass Company, Toledo, Ohio, a corporation of Ohio No Drawing. Application August 8, 1950, Serial No. 178,358

1 Claim. (Cl. 154—128)

This invention relates to cementing a compressed metallic powder ring to a compressed insert composed of inorganic plastically deformable crystals with a paste of finely divided inorganic plastically deformable crystals.

Many substances, including some inorganic, non-metallic materials, are characterized by having plastically deformable crystals. The designation "non-metallic" is intended to exclude not only metals but also those compounds having metallic characteristics, e. g. ready electrical conductivity such as carbides. For a comprehensive discussion of plastically deformable materials see U. S. patent to Buerger, No. 2,362,430 issued November 7, 1944.

In the ceramic art it is desired to produce a structure of non-metallic material surrounded by a metallic ring wherein the metallic and non-metallic portions are firmly bonded together. It is further desired that these parts be molded to fairly close tolerances. Bonding of molded pieces may be accomplished by use of cements such as Bakelite and other organic resins, as well as compounds such as sodium and ethyl silicate and various glasses. But such materials may not be stable at high temperatures, may react with the component pieces, or are otherwise unsuitable.

Accordingly it is an object of this invention to disclose a method of bonding firmly a metallic ring to a non-metallic insert by means of a non-metallic inorganic plastically deformable binder which is stable at high temperatures.

Briefly the process consists in molding a ring of metal by compressing metallic powder, molding a non-metallic insert by compressing crystals of a non-metallic crystalline plastically deformable material sufficiently to cause plastic deformation, applying a thin coat or layer of a slurry of finely divided material which is of the same chemical composition as the non-metallic insert ring and/or the outside of the non-metallic piece, assembling the structure, drying the paste, and firing the structure at a temperature below the melting point of any of the elements or of the paste and above the temperature at which sintering of the metal and the critical temperature of crystal growth of the non-metallic materials begin.

The finished article is a solid, dense coherent body.

The pressure employed in molding the non-metallic elements must be sufficient to cause plastic deformation of the crystals. This pressure is sufficient to cause the elements to possess a specific gravity which approaches the theoretical for a voidless solid. In practice it has been found that a specific gravity of 75% of theoretical and preferably and more generally between 90% and 100% is satisfactory. The pressure employed in molding the metallic portion is that pressure acceptable in the powder metal molding art which is normally between 15 and 40 tons per square inch. Such structures also have a density equal to at least 75% of theoretical and generally between 90% and 100%.

In order to understand the invention more thoroughly the following discussion is given:

The non-metallic center must be composed of finely divided crystals of plastically deformable material. The crystals are placed in a suitable mold and compressed with a pressure sufficient to cause plastic deformation; this pressure is in excess of 20 tons per square inch. When the pressed structure is heated for a period of time recrystallization takes place. The reason for the recrystallization is not clear, but the resulting product is dense, coherent and strong.

The metallic ring is prepared in accordance with the powder metal art. That is, finely divided metal is compressed to form a green structure which upon heating to the sintering point for a period of time the product becomes strong.

The slurry employed for binding the ring to the non-metallic portion is of the same chemical composition as that of the non-metallic portion and is a finely divided crystalline material reduced to an impalpable powder and mixed with water to form a paste of the consistency desired. It has been found that painting it on both the inside of the ring and outside of the center piece is a satisfactory method of application.

In the operation of the process the ring, center and paste are formed, assembled, the paste dried, and the assembled structure is fired. If any one of the elements making up the assembly is fired before assembly bonding will not take place.

The relationship between the internal diameter of the green ring and the external diameter of the non-metallic portion does not appear to be critical but sufficient clearance of a few thousandths of an inch must be left to provide room for the paste. The diametrical clearance may be in the order of from about 0.005 to about 0.015 thousandths of an inch advantageously while diametrical clearances of about 0.006 inch to 0.010 inch are preferred.

In the selection of combinations of metallic and non-metallic materials care must be taken to select a metal whose sintering temperature corresponds to that of the recrystallization temperature of the non-metallic paste and center.

By sintering temperature of the metal is meant that temperature at which a compressed powdered metal piece will form a strong bond without the aid or presence of any substantial amount of melting.

Every material which is plastically deformable, when reduced to a fine powder, and compressed sufficiently to cause plastic deformation, will, when heated above a critical temperature experience recrystallization and crystal growth. A fluid or vitreous phase may appear at a temperature above that at which crystal growth and recrystallization are experienced. The recrystallization range of temperature is that range above the temperatures at which recrystallization of plastically deformed non-metallic crystals starts and below the temperature at which any substantial degree of liquid phase occurs.

The time of firing the structure is not critical, but the strength increases with time up to several hours. Further firing after maximum strength is reached is of no value. It follows therefore, that firing is continued until sufficient or until maximum strength is secured.

Typical powdered metals include copper, iron, and stainless steel. Typical plastically deformable non-metallic materials include calcium fluoride (fluorite), magnesium oxide, aluminum oxide, beryllium oxide and calcium sulfate (anhydrite). Metal ring-non-metal center combinations preferred include copper-fluorite, stainless steel-magnesium oxide; iron-magnesium oxide; stainless steel-beryllium oxide, and iron-calcium fluoride combinations.

In order to understand this invention more fully the following examples are given:

Example I

A 0.500 inch diameter disk of calcium fluoride was prepared by compressing powdered (170 mesh or finer) calcium fluoride with a pressure of 40 tons per square inch. Powdered copper of 100 mesh or finer was compressed with 30 tons per square inch in a mold to form a ring having an internal diameter of about 0.506 inch. A paste consisting of finely ground fluorite and water was applied to the edges to be cemented and the disk was inserted in the copper ring. The assembled structure was dried at about 100° F., then fired at 1850° F. for three hours in vacuum; the ring and the disk were tightly bonded together.

Example II

Copper powder 100 mesh or smaller was placed in a ring mold and compressed at 40 tons per square inch at room temperature to produce a ring having an internal diameter of 0.505 inch. Ground calcium fluoride powder of 170 mesh or finer was placed in a mold and compressed at 40 tons per square inch at room temperature to produce a disk of 0.500 inch in diameter. Calcium fluoride powder ground to an extremely fine impalpable powder was made into a slurry with water, the slurry was painted in a thin layer on the inside of the copper ring and on the outside of the green compressed calcium fluoride disk; the disk was placed in the ring, the assembled structure placed in an oven at about 100° F. and dried. The dried structure was placed in a furnace and fired at 1800° F. in vacuum for 2 hours. When removed from the oven and cooled, an excellent bond between the copper ring and the calcium fluoride disk was present.

Example III

The procedure of Example II was followed except that the ring and disk were fired first for two hours; the paste was applied, the assembly dried, and fired at 1800° F. for two hours. A poor bond was obtained.

Example IV

The procedure of Example II was followed except that no cement was employed. The disk after firing was not cemented to the ring.

Example V

A stainless steel ring surrounding a beryllium oxide center may be prepared in a manner similar to Example I. It is advantageous to prepare the beryllium oxide by forming pellets and firing these at 2500° F. The pellets are then crushed to finer than 100 mesh and compressed into the desired shape at 40 tons per square inch. In this way, a denser product is obtained. A clearance of a few thousands of an inch should be provided between the ring and insert. An aqueous slurry of very finely divided beryllium oxide may then be painted on the outside edge of the beryllium shaped piece, the ring and shaped beryllium piece assembled, placed in an oven at 100° F. to dry; and finally fired at 2450° F. for 2 hours in a vacuum. A strong tightly bonded piece is thus produced.

Example VI

An iron ring surrounding and tightly bonded to a magnesium oxide center may be prepared by the general procedure of Example I. The ring of iron is prepared by compressing iron powder of —100 mesh at 40 tons per square inch having an internal diameter of 0.510 inch. The disk of 0.500 inch in external diameter molded from magnesium oxide (periclase) —100 mesh at 40 tons per square inch is prepared. The outside edge of the disk is painted with an aqueous slurry of very finely divided magnesium oxide, and placed in the ring. The assembled structure is dried in an oven and fired in vacuum for 2 hours at 2200° F. The resultant piece is dense and strong.

Example VII

An iron ring tightly bonded to a calcium fluoride center may be prepared in substantially the same manner and structure of Example VI using the same molds, clearances and pressures. The iron ring is prepared in the same manner as above and the calcium fluoride paste and center in the same manner as the magnesium oxide disk. The slurry of calcium fluoride is painted on the inside of the iron ring, the structure assembled, dried, and fired at 2100° F. for 20 minutes. The resulting structure is strong and tightly bound.

It is to be noted that several types of non-metallic materials do not fulfill the definition of plastically deformable crystalline materials. These include the common organic resins, and various glasses which are not crystalline in nature, as well as materials which are not plastically deformable such as quartz. Other materials such as clays, and carbon materials such as graphite and carbon black, are also excluded. Non-metallic materials fulfilling the requirement of being plastically deformable can readily be determined by the tests set forth in U. S. patent to Buerger, No. 2,362,430, issued November 7, 1944. The temperature at which recrystallization begins can readily be determined by plastically deforming the crystals, by pressure in a mold and firing the resulting molded product at gradually increasing temperature intervals at about 1 hour for each, until a firmly bonded material results. The critical temperature for calcium fluoride is about 1710° F., for instance, and the melting point is 2480° F. Calcium fluoride may therefore be matched with a metal having a sintering temperature between 1710° F. and 2480° F. It is preferred however to operate at least 25° F. below the temperature at which the fluid state occurs and at least 25° F. above the critical point (the point at which crystal growth begins).

The fineness to which the metallic and non-metallic materials are reduced is not critical but they should pass through a 48 mesh screen and preferably through one of at least 100 mesh or finer. The cementing material should also be finely divided and in general should pass through a 200 mesh screen or finer.

If desired the non-metallic center may be molded around metal wires having a relatively small diameter compared with that of the non-metallic piece. The wire becomes tightly bound after firing even though no paste is employed.

It is to be understood that metallic materials are subject to oxidation, and the firing should be carried out in a protective atmosphere such as hydrogen, carbon monoxide, or in a vacuum.

It may be readily appreciated that the structures prepared have a wide range of usefulness. They may be employed for conducting leads through an insulated section while the ring may be soldered to a metal or glass portion of the total structure. Thus as a base for a vacuum tube, the leads would come through the base, and the glass tube would be sealed to the metal ring.

This application is a continuation-in-part of our U. S. application Serial Number 621,376 filed October 9, 1945, and now abandoned.

The ring may or may not be circular in configuration, but may have any desired shape such as that of a hexagon. By the term "metal ring" in the appended claims is meant, a continuous metal piece of any shape, the internal configuration of which closely conforms to that of the non-metal portion.

We claim:

The process of forming a structure consisting of a metallic ring surrounding and bonded to a non-metallic center which comprises molding separately under pressure a ring of finely divided copper powder and a center from a mass of finely divided calcium fluoride crystals, said pressure being sufficient to plastically deform said finely divided materials and to impart to said ring and said center a specific gravity of not less than about 75% of the true specific gravity thereof, applying a thin layer of finely divided calcium fluoride in the form of a slurry to both surfaces to be bonded, assembling the ring around said center into the final structure with said surfaces in contact with said layer between, the clearance between said ring and said center being a few thousandths inch, and heating said assembled structure to a temperature above that at which sintering takes place of said ring and recrystallization begins in said center and below that at which melting begins in either said ring or said center, said heating being continued until a firm bond between said ring and said center is effected.

References Cited in the file of this patent

UNITED STATES PATENTS

| Number | Name | Date |
| --- | --- | --- |
| 1,564,690 | Kruh | Dec. 8, 1925 |
| 2,015,482 | Lilienfeld | Sept. 24, 1935 |
| 2,343,038 | Allen | Feb. 29, 1944 |
| 2,386,628 | Nazzewski | Oct. 9, 1945 |
| 2,422,628 | McCarthy | June 17, 1947 |
| 2,555,877 | Doran | June 5, 1951 |

FOREIGN PATENTS

| Number | Country | Date |
| --- | --- | --- |
| 369,964 | Great Britain | of 1932 |